United States Patent [19]

Lonseth et al.

[11] 4,095,627

[45] Jun. 20, 1978

[54] CORONA INHIBITION IN DYNAMOELECTRIC MACHINES

[75] Inventors: Palmer Lonseth; Hubert Gerald Panter; Donald G. Moorby, all of Peterborough, Canada

[73] Assignee: Canadian General Electric Company, Toronto, Canada

[21] Appl. No.: 656,791

[22] Filed: Feb. 10, 1976

[30] Foreign Application Priority Data

Mar. 7, 1975 Canada .................................. 221543

[51] Int. Cl.² ............................................. B65B 3/04
[52] U.S. Cl. .................................... 141/250; 141/392; 264/272; 310/196
[58] Field of Search .............................. 141/250–284, 141/392, 311, DIG. 1; 264/272; 310/196

[56] References Cited

U.S. PATENT DOCUMENTS 2,292,599  8/1942  Batie ..................................... 141/284

Primary Examiner—Houston S. Bell
Attorney, Agent, or Firm—John F. Ahern; Herbert E. Messenger; James W. Mitchell

[57] ABSTRACT

According to the invention, electrically conductive paths are formed between the coil armor and the core laminations of dynamoelectric machines for inhibiting corona. This is achieved by injecting an uncured, semi-conducting, elastomeric material between the coil sides and slot walls through the use of an injector tool inserted between them, and thereafter curing the material. The uncured material has a viscosity which enables it to be forced under pressure into these spaces, and when cured it has a resistance high enough not to form eddy current paths between laminations and yet low enough to conduct charge from the coil armor to the core. It is also capable of retaining its strength, elasticity, conductivity, etc., and remaining in place between the coils and core under vibrations, coolant flow, electric stresses, repeated temperature changes, etc., for the normal operating life of the machine.

4 Claims, 5 Drawing Figures

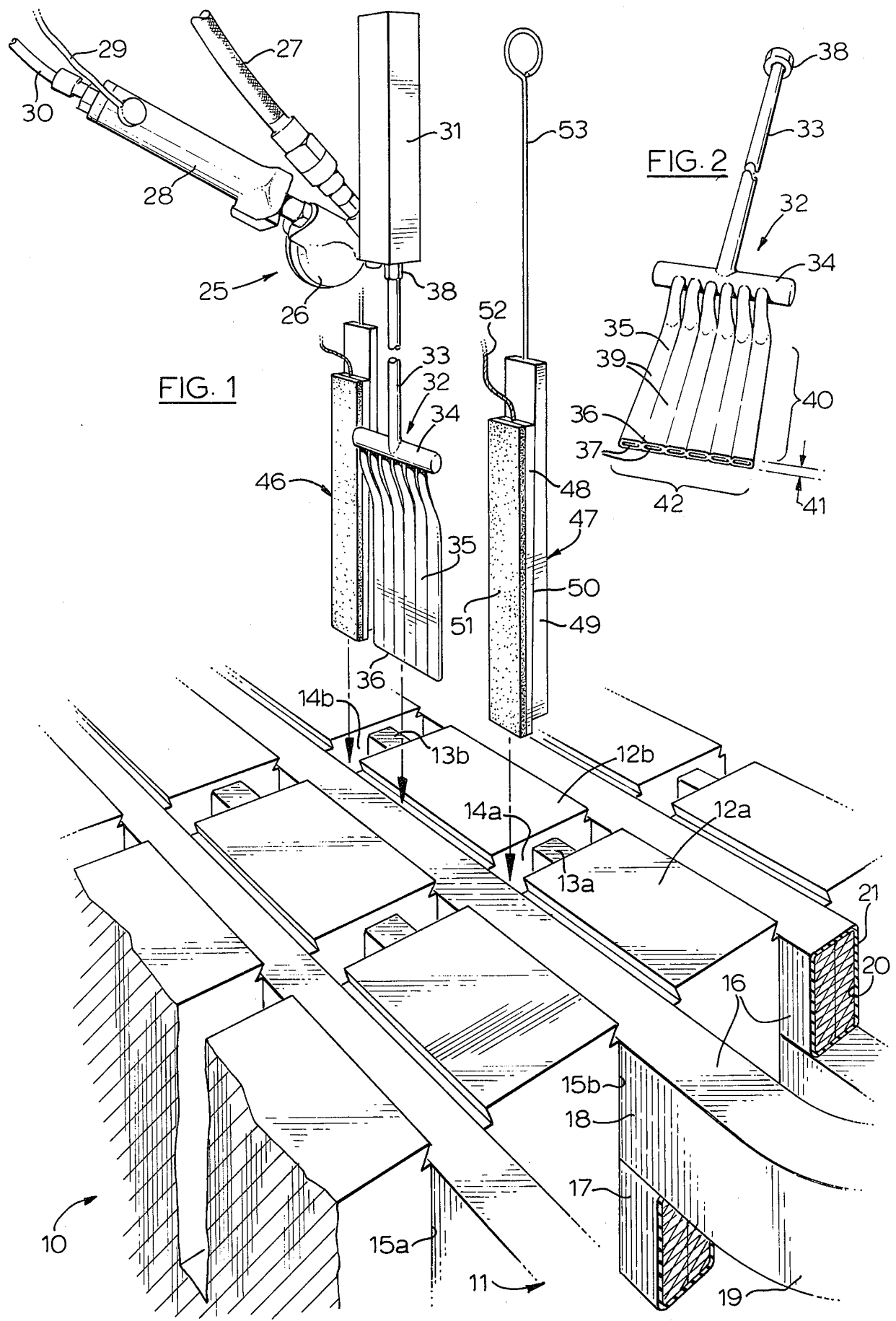

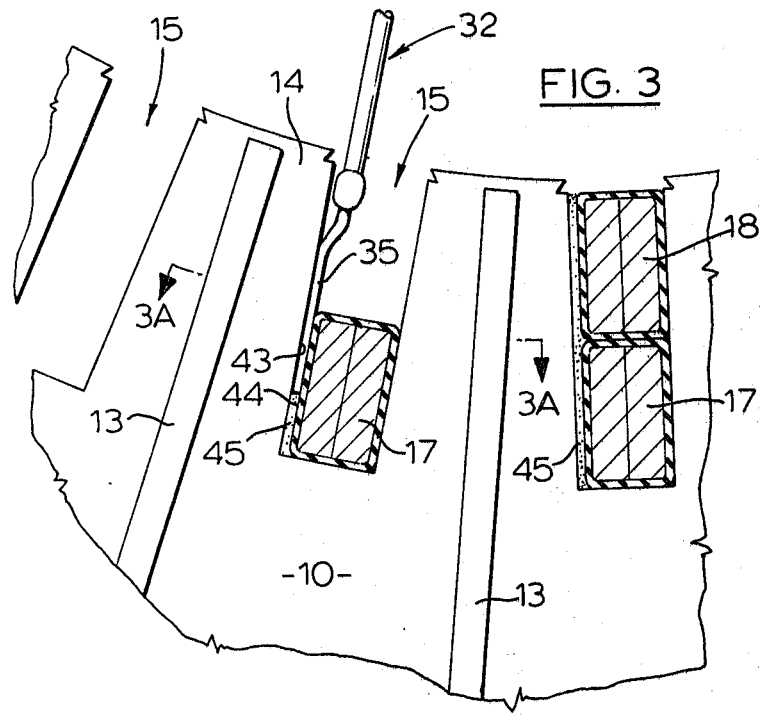
FIG. 3
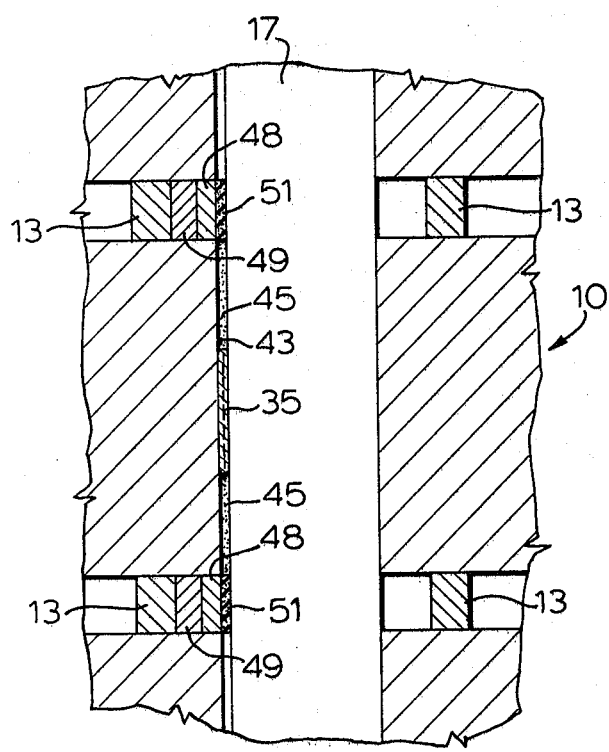
FIG. 3A
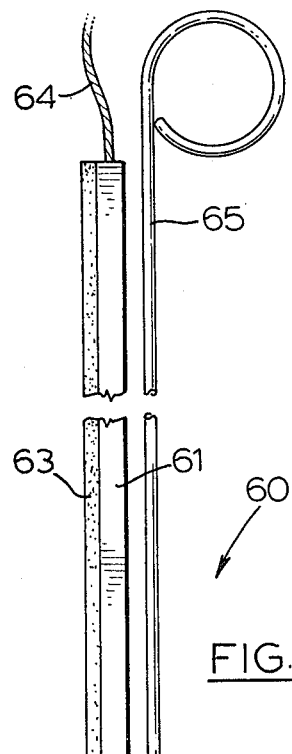
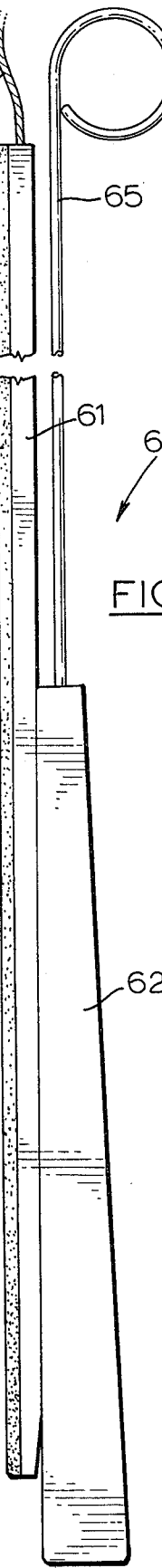
FIG. 4

CORONA INHIBITION IN DYNAMOELECTRIC MACHINES

BACKGROUND OF THE INVENTION

This invention relates to a method for providing conductive paths from the outer surface of conductor insulating jackets to the magnetic cores in dynamoelectric machines for purposes of inhibiting corona in the machine.

In large dynamoelectric machines, such as the generators used by electric utilities, the high voltage winding has the sides of the coils located in slots in a magnetic core member. The coils used in these machines have jackets for insulating the conductors from the core. Since these machines operate at relatively high voltage, the outer surface of the jacket usually includes a covering of a semiconducting material serving as a voltage grading medium and commonly known as the coil armor. The jackets usually consist of wrappings of porous materials impregnated with certain thermosetting resins which cure to a solid and hard state. The sides of the coils, i.e., those portions of each coil to be placed in slots in the core, are shaped in molds while the resins are still plastic and held to these shapes while the resins cure. The outer surfaces of the coil side are left very smooth, hard, and with some irregularities in flatness. To facilitate the insertion of the coil sides into the respective slots, each side is usually made to be a clearance fit in its slot. Because the slots may vary somewhat in size and surface smoothness, the sides are made to tolerances which take this into account. As a result, there is usually some looseness of a side in its slot. It is known to insert packing strips between a coil side and a slot wall to tighten up the fit and thereby prevent movement of the side in the slot. These strips may be thin, non-metallic, electrically conductive springs which secure the side in the slot and provide electrical paths of controlled resistance between the coil armor and the slot wall. However, since the strips come in discrete thicknesses that can be driven between a coil side and a slot wall, this packing may not always make a side a tight fit in all of its slot, particularly if the winder is lacking in skill or is not careful; any looseness may lead to coil movement resulting in corona problems.

Electrical grade resinous materials should be good insulators of electricity and reasonably good conductors of heat. Certain epoxy resins meet this specification. However, those that do meet the specification cure to a hard state, and once fully cured, they do not soften appreciably when reheated during operation of the machine. These materials produce the so-called hard-bar windings in which the resin impregnants do not soften, when the coils become hot, and flow into the voids as did the asphaltic impregnants that preceded them. Hence, the hard-bar windings are more prone to void formations due to the following: looseness of bars in their slots; irregularities in bar surfaces; irregularities in slot walls; and coil vibrations.

If the coil armor makes good electrical contact with the laminations defining the slot walls, the armor and the core will be at essentially the same potential. However, the presence of voids degrades these contracts and frequently leads to differences in potential between the armor and core. These potential differences impose electrical stresses on the gases in the voids, stresses that may well be great enough to cause partial discharge from the coil surfaces to the core, i.e., a phenomenon often referred to as corona or corona discharge. The improved resinous materials make higher operating voltages possible, and this in turn subjects the void regions to higher electrical stresses, or these newer insulations may even increase stresses without an increase in voltage. It is well known that in the presence of corona discharge insulating materials are eroded and may eventually break down.

Our copending Canadian application, Ser. No. 192,819, filed Feb. 18, 1974 describes and claims a means for inhibiting corona in dynamoelectric machines such as large power generators. In this application, an elastomeric material of controlled electrical resistance is applied to the coil sides and then cured before the sides are inserted into the slots in the core. The lay of this material on a coil side is such that the material deforms as the side is inserted into a slot, causing the material to make contact with the laminations. In this particular approach to the corona problem, the elastomeric material is applied to the coil sides before they are inserted in the slots; the material cannot be applied to the coil sides already in place in the slots. This mode of treatment produces good results, but in some machines, e.g., the stator core of a steam turbine-generator, it is difficult to insert the coils sides in the slots.

According to the invention conductive paths are formed between the winding and the core of a dynamoelectric machine by injecting a viscous, semiconducting, elastomeric material between the coil sides and the walls of the coil retaining slots in the core through the use of an injector tool inserted between them, and thereafter curing the material. The cured material is a tough rubber-like substance of an electrical resistance high enough not to short circuit the laminations of the core and yet low enough to conduct electric charge from the coil armor to the core; it is a substance that is capable of retaining its strength, elasticity, conductivity, etc., and remaining in place between the coils and core under vibration coolant flow, electric stresses, repeated temperature changes, etc., for the normal operating life of the machine. These paths conduct electric charge from the coils to the core, and thereby inhibit the formation of corona. Resin flow into the coolant ducts is blocked off during injection.

Certain silicone resins are well suited for injection as conductive path forming materials between the coils and core. Inherently, silicone polymers, i.e., rubbers, are good electrical insulators, but some are relatively good conductors of heat as well. The good heat conductors are preferred because they will transfer heat from the coils to the core. To make them electrically conductive for purposes of conducting electric charge, they are filled with conductive fine particle materials such as carbon powder, lamp black or a mixture thereof. The amount of conductive power added to the resin is just enough to give the cured product (the rubber) the necessary electrical properties, but not enough to detract significantly from its physical properties.

Apparatus for injecting an uncured elastomeric material into the space between a coil side and a wall of the slot containing the side may consist of an injector tool adapted for insertion into this space and means for forcing the material to flow through the tool into the space. Means are also provided for blocking flow of the material into the coolant flow ducts on either side of the tool.

A preferred embodiment of the invention will now be described with reference to the accompanying drawings, in which:

BRIEF DESCRIPTION OF THE DRAWINGS

FIG. 1 is an exploded perspective view of a small portion of the stator of a large dynamoelectric machine and a gun assembly for injecting an uncured elastomeric material into the spaces between the coil sides and the slot walls;

FIG. 2 is a view in perspective of the injector tool;

FIG. 3 is a view of the nozzle assembly of the injector tool in place between a coil side and one wall of its slot for material injection;

FIG. 3A is a view looking down into the middle slot of FIG. 3; and

FIG. 4 is a view of a member used for insertion into the radial ducts in the core for blocking material flow into these ducts during injection between coil sides and slot walls.

DETAILED DESCRIPTION OF THE INVENTION

For purposes of the foregoing discussion and the description to follow, a winding for a dynamoelectric machine is to be regarded as a large number of coils interconnected in a suitable circuit configuration. Each coil may have one or more turns of either a single conductor or a number of parallel strands. When references are made to coil sides, these are the portions of a coil that are located in the slots of the core. The end heads are the portions of the coils projecting from the core.

FIG. 1 shows a portion of a stator for a dynamoelectric machine such as a large generator and apparatus for injecting an uncured elastomeric material into the spaces between the coil sides and the slot walls. The stator consists of a laminated magnetic core 10, a winding 11 and the usual supporting structure, none of which is shown. The core is made up of a plurality of stacks 12a, 12b, etc., of laminations, the stacks being spaced apart axially by means of the radially disposed spacers 13a, 13b, etc., so as to define radial ducts 14a, 14b, etc., for coolant flow. The core contains a plurality of axially directed slots 15a, 15b, etc., and the winding consists of a plurality of coils 16 having sides 17 and 18 located in two different slots and end turns 19 projecting from the ends of the core. Each coil has one side 17 located in the bottom of one slot and the other side 18 located in the top of another slot at approximately one pole pitch coil span. This is a conventional core having a plurality of equally spaced slots containing a conventional distributed winding, a winding frequently found on the primary side of AC motors or on the armature of AC generators. The invention to be described later is in no way limited to this or any other particular core and coil arrangement.

Each coil 16 is shown as consisting of a plurality of conductor strands insulated from one another and encased in a jacket consisting of an inner insulating jacket 20 and an outer armor jacket 21. The strand insulation may be a covering of bonded glass filaments. After the strands have been formed into a coil of the desired number of turns and shape, the insulating and armor jackets are applied. Typically, the inner jacket is a number of layers of insulating materials such as resin bonded micaceous tapes, and the armor is one or more layers of a semiconducting tape or paint, i.e., a material having a controlled resistance. The tapes may be several mils in thickness, and they may be applied in a number of layers, depending on the voltage that they must withstand. The layers are applied tightly and as uniformly smooth as possible, after which the resins in the tapes are cured by heat and pressure to achieve the necessary insulating properties. Even with the most careful application of the tapes and curing of the resins with the coil sides in pressure molds there will be some variations in width of the coil sides and flatness of their radial surfaces, i.e., these surfaces are frequently slightly concave. Hence, there is usually some looseness of coil sides in their slots. When fully cured the resin bonded materials become very hard and rigid and do not soften appreciably when reheated. As a result, the radial surfaces of the coils present somewhat irregular and unyielding interfaces with the irregular surfaces of the punchings forming the slot walls. The hard coils do not soften when reheated from machine operation, nor do they deform when hot to fill the slots as did the asphaltic compounds of the prior art.

Apparatus for injecting an uncured elastomeric material into the spaces between the coil sides and the slot walls is the hand held gun assembly illustrated at 25 in FIG. 1 combined with a dispenser which is not shown. The dispenser is an air operated hydraulic pump which forces the uncured elastomeric material from a pail into a high pressure ram pump; the ram pump then forces the material at several hundred pounds pressure through the flexible hose 27 to the non-drip metering valve 26 of gun assembly 25. Valve 26 is mounted on a hand grip 28 which also houses the valve operating mechanism. This mechanism is operatively connected to the dispenser electrically and pneumatically by way of conductors 29 and flexible hose 30 for purposes of coordinating the operation of the combination. The injection apparatus described so far is known and available commercially, for example, it is used in building construction for sealing windows and masonry joints with thick paste-like compounds. In addition to the known assembly of components 26 to 30, gun assembly 25 includes a body portion 31 and an injector tool 32 projecting from the body. Metering valve 26 is also attached to body 31; hence, components 26 to 32 comprise a single assembly. Tool 32 consists of a tube 33 secured at one end to body 31 by means of a screw-type fitting 38, a manifold 34 on the other end of the tube, and a flat and very thin nozzle assembly 35 projecting from the manifold. Tool 32 is shown in detail in FIG. 2. In appearance, the tool resembles a space, the tube resembling the handle and the nozzle assembly the blade. Body 31, tube 33, manifold 34, and nozzle assembly 35 contain passages placing the outlet of metering valve 26 in material flow communication with the one or more orifices 37 in the tip 36 of the nozzle. Hence, the uncured elastomeric material released by the metering valve flows through these passages and is discharged from the orifices.

Nozzle assembly 35 must be capable of being inserted into the space between a coil side and a slot wall as best illustrated in FIG. 3 in an exaggerated way. Since this space is usually maintained at the minimum necessary for the insertion of the coil sides into the slots and give them some freedom of movement during the interconnection of the end turn portions, the nozzle assembly is made very thin, e.g., in the order of 25 to 30 mils. FIG. 2 illustrates a nozzle assembly 35 which has been found to perform well for the injection of thixotropic materials of the type to be mentioned later. This nozzle assembly consists of a number of small diameter, thin wall tubes 39 projecting from manifold 34. At the manifold, the tubes are circular, and are located side-by-side in spaced parallel relation. A major portion 40 of the length of the tube assembly is flattened out to a thickness 41 and width 42. In the flattened region the tubes are parallel, touch one another, and are secured together by means such as soldering or bracing. This same means is employed to secure tubes 39 and 33 to manifold 34. The flattened region is offset with respect to the manifold to enable the nozzle assembly to be inserted through the slot openings and down into the slots into the spaces between the slot walls and the coil sides in the bottoms of the slots as illustrated in FIG. 3; without the offset, the manifold would interfere with nozzle insertion unless the flattened portion is made longer than otherwise necessary. The upper coil sides are more accessible for nozzle insertion. A convenient length 40 is about the radial dimension of the coil sides. Width 42 is somewhat less than the axial dimension of the lamination stacks 12, i.e., the distance between ducts 14. Although a thin-wall, single orifice nozzle can be used, a tubular structure such as shown in FIG. 2 is considered superior because it stands up better to the relatively high injection pressures. FIG. 3 shows nozzle assembly 35 in the space between the wall 43 of a slot 15 and the radial surface 44 of a lower coil side 17 and the space partially filled with the ejected material 45. The method will be considered later.

Since the material 45 prior to covering is a thixotropic material and is discharged from nozzle assembly 35 at considerable pressure; it tends to flow along surfaces 43, 44 to fill the entire space between these surfaces and then overflow into ducts 14 if not stopped from doing so. A pair of devices 46 and 47 are shown in FIG. 1 for stopping flow of the material into ducts 14a and 14b. These devices will be used with any of the other stacks to be treated, and in each case they will be located in the adjoining ducts on the same side of the coil side. Since devices 46 and 47 are alike in structure and function, only device 47 will be described. This device takes the form of a two-part wedge 48, 49 adapted to be inserted into a duct and wedged between a coil side 17 or 18 and a spacer 13 through relative longitudinal movement of the parts along the common oblique surfaces 50. The face of part 48 is covered with a rubber-like substance 51 which deforms readily when the substance is compressed. To place the blocking device in a duct 14, part 49 is inserted first well into the duct, after which part 48 is inserted and placed with its face substance 51 against the radial surface of the coil side where blocking is to take place. With part 48 held in place, part 49 is withdrawn from the duct until the two parts become wedged therein between the coil side and the spacer 13. When part 49 backs on to the spacer, it forces part 48 toward the coil side, compressing substance 51. As substance 51 compresses it also deforms into the spaces between the coil side and the slot walls, blocking them off at the duct. Parts 48 and 49 may be provided with a cord 52 and a handle 53 respectively to aid in manipulating them into place in a duct and removing them from the duct. In the arrangement illustrated in FIG. 1, device 47 is inserted into duct 14a and device 46 into duct 14b, whereby the space between the coil side and the slot wall, into which nozzle assembly 35 is inserted, is blocked at the adjoining ducts so the material ejected from the nozzle assembly cannot flow into these ducts. This manner of blocking is adaptable to all other spaces selected for injection, except those terminating at the ends of the core, where other means of blocking can be readily applied from between end heads.

FIG. 4 illustrates a blocking device 60 suitable for use in a stator having a relatively small diameter core bore, e.g., the stator of a steam turbine-generator. Because the bore of the core is relatively small in diameter, its fluid flow ducts diverge significantly from the bore surface to the outer surface of the core. As a result, the blocking device is tapered as shown. This device consists of two parts 61 and 62 which can be wedged between a coil side and a spacer. Part 61 is rectangular and has a face covering 63 of a rubber-like substance which deforms when pressed against a coil side. Part 62 is wedge-shaped as shown to conform with the divergent ducts. To place blocking device 60 in a duct, part 62 is inserted first well into the duct, after which part 61 is inserted and placed with its face substance 63 against the radial surface of a coil side. With part 61 held in place, part 62 is withdrawn from the duct until the two parts become wedged therein between the coil side and spacer. Substance 63 now deforms and blocks the space between the coil side and the slot walls at the duct. Part 61 may be provided with a cord 64 and part 62 with a handle 65 to help manipulate them into and out of place in a duct.

The method of injecting the uncured elastomeric material between coil sides and slot walls will now be considered. This is carried on during winding of the stator, i.e., the operation of placing the coil sides in the slots; the lower coil sides 17 are treated first while the upper halves of their slots are empty as illustrated in FIG. 3, and the upper coil sides 18 are then treated before their slot wedges are inserted. The material 45 may be placed on the same side of the two coil sides 17 and 18 as illustrated in FIG. 3 or on different sides, depending upon the disposition of the coil side in its slot. In other words, material 45 may be on the left side of 17 and on the right side of 18 for given slots as viewed in FIG. 3 or vice versa.

Reference will now be made to FIG. 1 for a step-by-step procedure that can be followed.

(1) The two blocking devices 46 and 47 are inserted into the adjacent ducts 14b and 14a into place along the radial surface of the coil side to be treated, and then wedged securely between the coil side and spaces 13b and 13a. Wedging of the devices deforms the rubber-like substances 51, causing them to block off the spaces between the coil side and the slot walls at both ducts.

(2) Holding gun assembly 25 in the hands, the nozzle assembly 35 of injector tool 32 is inserted into the space mentioned in (1) above. The nozzle is inserted through the slot opening about midway between devices 46 and 47, tip 36 first, and then gently urged well down into the space, e.g., into a position such as that illustrated in FIG. 3.

(3) Valve 26 is then actuated to release a set quantity of the uncured elastomeric material. The material released is discharged under pressure from the orifices in the nozzle assembly into the space between the coil side and the slot wall.

(4) During release of the material, the nozzle assembly is withdrawn in the space to facilitate an even distribution of the material throughout the space. The quantity of material released is set by valve 26 to fill the space and no more, and material flow into the ducts is stopped by devices 46 and 47.

(5) Finally, the injector tool is removed from the slot, and after the material has taken its initial set where it will remain in place, the blocking devices are removed from the ducts.

(6) Steps (1) to (5) are repeated for each one of the other places to be treated, which may or may not be the entire length of each coil side. This is carried on during winding, the lower coil sides being treated before the upper sides are inserted, and the upper sides before the wedges are applied.

Since the material released is under relatively high pressure, it is forced in between the coil side and the slot wall to fill the entire space. Any looseness of a coil side in its slot is taken up by the pasty material forcing the side over firmly against the other side of the slot as the material is squeezed between the coil side and slot wall. The properties of the material are such that once in place between a coil side and a slot wall it has very little tendency to be forced out, even though the blocking devices have been removed after an initial set of the material. Curing of the material is effected by simply leaving it undisturbed for a period of time under room conditions. It cures rapidly when exposed to air, becoming a tough, rubbery substance which holds the coil sides firmly in their slots.

The material forced between coil sides and slot walls is an electrical conductor in the sense that it allows electric charge to flow from the coil armor to the core, and in so doing it inhibits the destructive effects of corona. Materials found suitable for this purpose are certain room temperature vulcanizing (RTV) silicone resins. This type of resin is normally a heat conductor and an electrical insulator. Hence, to render it electrically conductive it is filled with fine particles of graphite and/or lamp black dispersed in the material. Examples of suitable silicone resins are those sold by the General Electric Company, Waterford, New York as RTV-108 and CRTV-5120, the former being an unfilled thermally conductive silicone resin and the latter a filled electrically and thermally conductive silicone resin. The amount of filler added is just enough to give the material an electrical resistance within a range of approximately 1000 to 80,000 ohms per square, and preferably about 4000 ohms per square. A resistance controlled within this range renders the cured material sufficiently conductive for readily passing charge on the coil armor to the core and sufficiently non-conductive that it does not form eddy current paths between the core laminations. The resistance of the cured material is of the same order of magnitude as the resistance of the coil armor. Materials answering this description are known in the art as "semi-conducting" materials. The amount of filler added is low enough that the physical and chemical properties of the polymer are not changed to a significant extent, and moreover, these properties along with the electrical resistance are maintained over the life of the machine. An example of a suitable silicone rubber composition is one comprising from about 20 percent to 50 percent by weight of electrically conductive carbon powder and from about 80 percent to 50 percent by weight of silicone rubber polymer. This particular composition cures rapidly at room temperature when exposed to the air, and remains stable during normal operation of the machine.

Silicone resins such as those mentioned above cure to become very tough and durable polymers which also bond fast to clean surfaces that they come into contact with. Hence, the cured material not only fills spaces between coil sides and slot walls, but it may also bond them firmly in their slots. This is very good so long as there is no need to remove any of the sides. However, in many instances it may well be necessary to replace defective coils or rewind the machine after years of service. If the coils are to be removable, as they usually must be, a release agent should be applied to the slot surfaces before the silicone resin contacts them. A release agent is a substance which prevents the polymer from adhering to these surfaces. In the case of a machine in the process of manufacture, a thin film of a release agent can be applied to the slot walls before the coil sides are inserted in the slots; usually, the release agent will be a liquid that can be brushed or sprayed onto the slot surfaces.

A material found to be suitable as a release agent is a Dupont liquid containing a dispersion of polytetrafluoroethylene (PTFE) and known in the trade as Vydax AR. This material is diluted with trichloroethane to obtain a mix suitable for brushing or spraying onto the slot surfaces. When the slot surfaces have been wetted with this mixture before injection of the resin, the cured product does not adhere to them and acceptable resistivity readings are obtained.

While our invention has been described herein with respect to certain preferred embodiments and specific examples, numerous modifications and changes will readily occur to those skilled in the art. We intend, therefore, to cover all such modifications and changes as fall within the scope of this disclosure.

What is claimed is:

1. Apparatus for injecting an uncured, semiconducting, elastomeric material between coil sides and slot walls of an electromagnetic component of a dynamoelectric machine; said component including a core member having a plurality of stacks of magnetic laminations spaced apart axially to define interstack spaces; axially directed slots in said core member; spacers disposed radially in said interstack spaces and extending between said slots to define ducts for coolant flow; and coil sides disposed in said slots; said apparatus comprising a body portion; material release means secured to said body portion and adapted for receiving said material under pressure from a source; an injector tool having a tubular stem projecting from said body portion and terminating in a flat nozzle assembly adapted to be inserted into the narrow space between a coil side and slot wall of a core stack by way of the slot opening, said injector tool containing material flow passages in communication with the output of said release means, through which material released by said release means flows and then discharged from orifice means in the tip of said nozzle assembly; and a pair of blocking devices adapted for insertion into the ducts adjoining said core stack for blocking off said space at these ducts.

2. The apparatus of claim 1 wherein said release means is a metering valve adapted to release a predetermined quantity of the material when actuated.

3. The apparatus of claim 1 wherein said nozzle assembly comprises an array of flat tubular members projecting from a manifold on said stem in edge-to-edge relation and secured together along said edges, the tips of said tubular members defining orifices in the nozzle assembly for material discharge.

4. The apparatus of claim 1 wherein each one of said blocking devices comprises a pair of elongated wedging members relatively movable longitudinally along a common oblique surface for driving a face surface on one member against the coil side and a back surface on another member against the spacer; a deformable rubber-like substance on the face surface of said one member, said relative movement wedging said members in said duct and in so doing deforming said rubber-like substance into said space between the coil side and slot wall, blocking off the space in the duct.

* * * * *